United States Patent
Nishimura et al.

(10) Patent No.: US 11,563,340 B2
(45) Date of Patent: Jan. 24, 2023

(54) POWER SUPPLY DEVICE, SERVER, AND POWER SUPPLY DEVICE MANAGEMENT SYSTEM

(71) Applicant: GS Yuasa International Ltd., Kyoto (JP)

(72) Inventors: Tsukasa Nishimura, Kyoto (JP); Hitoshi Nakayama, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 168 days.

(21) Appl. No.: 16/497,748

(22) PCT Filed: Mar. 29, 2018

(86) PCT No.: PCT/JP2018/013124
§ 371 (c)(1),
(2) Date: Sep. 25, 2019

(87) PCT Pub. No.: WO2018/181666
PCT Pub. Date: Oct. 4, 2018

(65) Prior Publication Data
US 2021/0103004 A1    Apr. 8, 2021

(30) Foreign Application Priority Data

Mar. 30, 2017  (JP) .............................. JP2017-066685

(51) Int. Cl.
*H02J 9/06*        (2006.01)
*H01M 10/42*    (2006.01)
*H02J 13/00*     (2006.01)

(52) U.S. Cl.
CPC .............. *H02J 9/06* (2013.01); *H01M 10/425* (2013.01); *H01M 2010/4278* (2013.01); *H02J 13/00* (2013.01); *H02J 13/00001* (2020.01)

(58) Field of Classification Search
CPC ................ G01R 31/396; H01M 10/42; H01M 10/425–4257; H01M 2010/4271–4278;
(Continued)

(56) References Cited

U.S. PATENT DOCUMENTS 6,741,896 B1 * 5/2004 Olzak .................. H05K 5/0213
700/82
9,800,291 B1 * 10/2017 Ben David ........... G06F 3/0688
(Continued)

FOREIGN PATENT DOCUMENTS

CN        102142186 A     8/2011
CN        102522606 A     6/2012
(Continued)

OTHER PUBLICATIONS

English machine translation of CN206021471U published Mar. 15, 2017 (Year: 2017).*
(Continued)

*Primary Examiner* — Toan T Vu
*Assistant Examiner* — David A Shiao
(74) *Attorney, Agent, or Firm* — McGinn I.P. Law Group, PLLC.

(57) ABSTRACT

A power supply device which is used as a backup power supply, including a power supply side acquisition unit that acquires information related to a position of the power supply device.

18 Claims, 9 Drawing Sheets

(58) Field of Classification Search
CPC .......... H02J 7/00; H02J 7/025; H02J 9/06–08; H02J 7/0047–005; Y04S 20/12; Y04S 20/248; G06F 1/26–3296
USPC ...................................... 307/66, 64, 80, 10.1
See application file for complete search history.

(56) References Cited

U.S. PATENT DOCUMENTS

| | | | |
|---|---|---|---|
| 2005/0071699 | A1 | 3/2005 | Hammond et al. |
| 2006/0031180 | A1* | 2/2006 | Tamarkin ............... G01D 4/004 705/412 |
| 2007/0124619 | A1* | 5/2007 | Mizukami ............ G05B 23/027 713/323 |
| 2008/0030078 | A1* | 2/2008 | Whitted .................... G06F 1/30 307/66 |
| 2010/0026244 | A1* | 2/2010 | Iida ....................... H02J 7/0063 320/134 |
| 2012/0235491 | A1* | 9/2012 | Nakashima ............... H02J 7/35 307/66 |
| 2012/0324245 | A1* | 12/2012 | Sinha ........................ G06F 1/26 713/300 |
| 2014/0129160 | A1* | 5/2014 | Tran ........................ H02J 3/004 702/61 |
| 2014/0342193 | A1* | 11/2014 | Mull ................. H01M 10/4257 429/50 |
| 2015/0323895 | A1* | 11/2015 | Obata ...................... G05F 1/56 399/88 |
| 2016/0041216 | A1* | 2/2016 | Tang ...................... G01R 29/18 324/509 |
| 2016/0093924 | A1* | 3/2016 | Peeters ............... H01M 50/103 429/90 |
| 2017/0205240 | A1* | 7/2017 | Nakamura ......... G01C 21/3484 |
| 2018/0048032 | A1 | 2/2018 | Takatsuka et al. |
| 2018/0307378 | A1* | 10/2018 | Ishikawa ............ G02B 27/0093 |

FOREIGN PATENT DOCUMENTS

| | | |
|---|---|---|
| CN | 106255866 A | 12/2016 |
| CN | 206021471 U | 3/2017 |
| CN | 106877447 A | 6/2017 |
| CN | 103840435 B | 5/2018 |
| EP | 2 908 193 A2 | 8/2015 |
| JP | S63-161814 A | 7/1988 |
| JP | H03-26248 U | 3/1991 |
| JP | 2001-069147 A | 3/2001 |
| JP | 2003-162460 A | 6/2003 |
| JP | 2005-146646 A | 6/2005 |
| JP | 2007-333393 A | 12/2007 |
| JP | 2010-277839 A | 12/2010 |
| JP | 2013-009531 A | 1/2013 |
| JP | 2015-156786 A | 8/2015 |
| JP | 6050909 B1 | 12/2016 |
| TW | 201632909 A | 9/2016 |
| WO | WO 2018/171541 A1 | 9/2018 |

OTHER PUBLICATIONS

English machine translation of JP2005146646A published Jun. 9, 2005 (Year: 2005).*
English machine translation of JP2001069147A published Mar. 16, 2001 (Year: 2001).*
International Search Report (ISR) (PCT Form PCT/ISA/210), in PCT/JP2018/013124, dated Jun. 5, 2018.
Extended European Search Report dated Dec. 13, 2019 for European Patent Application No. 18776701.7-1202.

* cited by examiner

| Network setting information | MAC address<br>IP address |
|---|---|
| Position information | Latitude, longitude |
| Device information | PS information<br>   Manufacture date,<br>   manufacturer name, model,<br>   serial number |
| | Battery information<br>   Manufacture date,<br>   manufacturer name, model,<br>   serial number |
| State information | Battery voltage, output current |
| ⋮ | ⋮ |

| Identification information | PS1 | PS2 | ... |
|---|---|---|---|
| Network setting information | MAC address<br>IP address | MAC address<br>IP address | ... |
| Position information | Latitude,<br>longitude, address | Latitude,<br>longitude, address | ... |
| Device information | PS information<br>  Manufacture date<br>Battery information<br>  Manufacture date | PS information<br>  Manufacture date<br>Battery information<br>  Manufacture date | ... |
| Alarm value | Battery voltage threshold value<br>Output current threshold value | Battery voltage threshold value<br>Output current threshold value | ... |
| Registration history | Information registration date<br>Information update date | Information registration date<br>Information update date | ... |
| Maintenance information | Power supply device<br>installation date<br>Battery replacement date | Power supply device<br>installation date<br>Battery replacement date | ... |
| ⋮ | ⋮ | ⋮ | ... |

POWER SUPPLY DEVICE, SERVER, AND POWER SUPPLY DEVICE MANAGEMENT SYSTEM

TECHNICAL FIELD

The present invention relates to a power supply device, a server, and a power supply device management system that manages the power supply device.

BACKGROUND ART

Conventionally, a power supply device management system that manages a power supply device is known. For example, Patent Document 1 discloses a battery deterioration monitoring system that monitors a deterioration state of a battery (power supply device).

PRIOR ART DOCUMENT

Patent Document

Patent Document 1: JP-A-2007-333393

SUMMARY OF THE INVENTION

Problem to be Solved by the Invention

Although the above-described conventional system monitors the deterioration state of the power supply device, it may fail to appropriately manage the power supply device because a malfunction caused by the position of the power supply device cannot be grasped.

An object of the present invention is to provide a power supply device, a server, and a power supply device management system which can manage the power supply device appropriately.

Means for Solving the Problem

A power supply device which is used as a backup power supply includes a power supply side acquisition unit that acquires information related to a position of the power supply device.

A server which is connected to a power supply device via a communication network includes: a server side transmission unit that transmits a signal that requests acquisition of information related to a position of the power supply device to the power supply device via the communication network; and a server side acquisition unit that acquires the information related to the position from the power supply device via the communication network.

A power supply device management system includes: a server; and a power supply device connected to the server via a communication network, in which the power supply device includes a power supply side acquisition unit that acquires information related to a position of the power supply device, and in which the server includes a server side acquisition unit that acquires the information related to the position from the power supply device via the communication network.

The present invention can be realized not only as the power supply device, the server, and the power supply device management system as described above, but can also be realized as a method including characteristic processes performed by the power supply device, the server, and the power supply device management system as steps. The present invention can also be realized as an integrated circuit including characteristic processing units included in the power supply device, the server, or the power supply device management system. The present invention can be realized as a program for causing a computer to execute the characteristic processes included in the above method, or can be realized as a recording medium such as a computer readable CD-ROM (Compact Disc-Read Only Memory) on which the program is recorded. Such a program can be distributed via a recording medium such as a CD-ROM and a transmission medium such as the Internet.

Advantages of the Invention

According to the power supply device and the like of the present invention, the power supply device can be managed appropriately.

BRIEF DESCRIPTION OF THE DRAWINGS

FIG. 5 is a diagram showing an example of power supply data stored in a power supply side storage unit.

FIG. 6 is a diagram showing an example of registration data stored in a server side storage unit.

MODE FOR CARRYING OUT THE INVENTION

Figure 1:
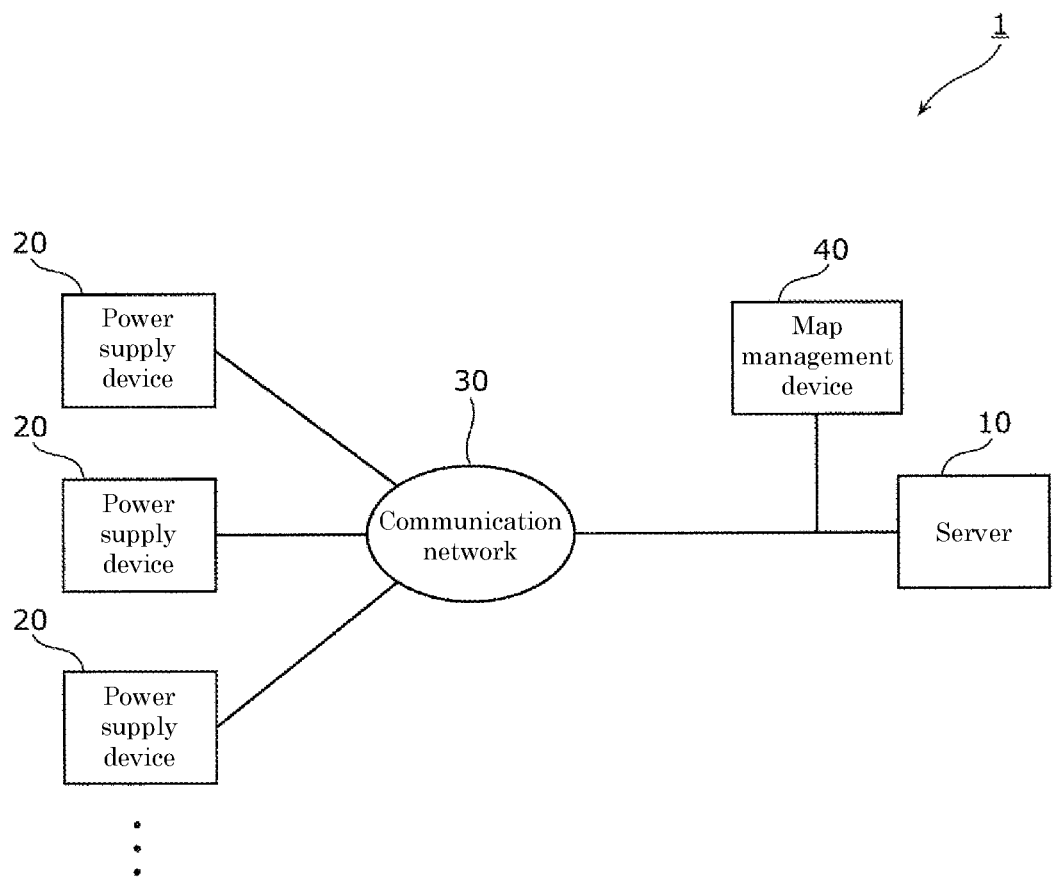
FIG. 1 is a schematic diagram illustrating a schematic configuration of a power supply device management system.

In order to appropriately manage a power supply device, it is important to grasp information related to a position at which the power supply device is installed. However, it may be difficult to grasp the information related to the position of the power supply device. For example, even when the installation position of the power supply device is registered, if the registration information is incomplete, for example, there is an error in the registration information or the registration information is unclear, it is difficult to grasp the position of the power supply device. Even if the registration information is not incomplete, when the power supply device is installed outdoors, it may be difficult to grasp the position of the power supply device because the details of where the power supply device is installed outdoors cannot be specified. The same applies to the case where the position of the power supply device is moved due to a disaster or the like.

However, in the above conventional system, since it is not recognized that it is necessary to grasp the information related to the position of the power supply device, even if the deterioration state of the power supply device is known, a malfunction caused by the position of the power supply device may fail to be grasped. For example, if information related to the position of the power supply device cannot be grasped, it becomes difficult to maintain or replace the power supply device. When the power supply device is moved due to a disaster or the like, it is difficult to grasp the state of the power supply device. In this way, the power supply device may not be managed appropriately.

A power supply device according to the present invention which is used as a backup power supply includes a power supply side acquisition unit that acquires information related to a position of the power supply device.

Since the power supply device can acquire information related to the position of the power supply device, the power supply device can be managed appropriately using the information related to the position.

The power supply device may further include an energy storage device connected to an external power supply and supplied with power from the external power supply, and the energy storage device may supply power to the power supply side acquisition unit and an external device to which the power supply device is connected when power supply from the external power supply to the power supply device and the external device is interrupted.

Even when the power supply from the external power supply is interrupted, the power supply device can supply power to the power supply side acquisition unit and the external device, so that it is possible to continuously acquire the information related to the position of the power supply device while supplying power to the external device. Thereby, the power supply device can be managed appropriately.

The power supply side acquisition unit may acquire information indicating at least one of an installation position and a posture of the power supply device as the information related to the position.

When the information indicating the installation position of the power supply device can be acquired, the installation position of the power supply device can be grasped, so that the power supply device can be easily maintained or replaced. If information indicating the posture of the power supply device can be acquired, it can be grasped that the power supply device is tilted or inverted, so that it can be used as an index as to whether or not a malfunction occurs in the power supply device. Thereby, the power supply device can be managed appropriately.

The power supply side acquisition unit may acquire information indicating at least one of a change amount and a change speed of at least one of an installation position and a posture of the power supply device as the information related to the position.

If information indicating the change amount of the installation position of the power supply device can be acquired, whether or not the power supply device is moved and the movement amount can be grasped, so that it can be used as an index for determining whether or not a malfunction occurs in the power supply device, whether or not a disaster occurs around the power supply device, or how large the disaster is. The same applies to the case where information indicating the change speed of the installation position of the power supply device, information indicating the change amount of the posture of the power supply device, and information indicating the change speed of the posture of the power supply device can be acquired.

The power supply side acquisition unit may acquire information indicating whether or not at least one of a change amount and a change speed of at least one of an installation position and a posture of the power supply device exceeds a predetermined threshold value as the information related to the position.

If information indicating whether or not the change amount of the installation position of the power supply device exceeds a predetermined threshold value can be acquired, whether or not the power supply device is moved significantly can be grasped, so that it can be used as an index for determining whether or not a major malfunction occurs in the power supply device, or whether or not a major disaster occurs around the power supply device. The same applies to the case where information indicating whether or not the change speed of the installation position of the power supply device exceeds the predetermined threshold value, information indicating whether or not the change amount of the posture of the power supply device exceeds the predetermined threshold value, and information indicating whether or not the change speed of the posture of the power supply device exceeds the predetermined threshold value can be acquired.

The power supply side acquisition unit may acquire information indicating whether or not at least one of the change amount and the change speed exceeds the threshold value by determining whether or not at least one of the change amount and the change speed exceeds the threshold value.

Since the power supply side acquisition unit has a function of determining whether or not the change amount of the installation position of the power supply device exceeds the predetermined threshold value, information indicating whether or not the change amount of the installation position of the power supply device exceeds the predetermined threshold value can be easily acquired. The same applies to the case where the power supply side acquisition unit acquires information indicating whether or not the change speed of the installation position of the power supply device exceeds the predetermined threshold value, information indicating whether or not the change amount of the posture of the power supply device exceeds the predetermined threshold value, and information indicating whether or not the change speed of the posture of the power supply device exceeds the predetermined threshold value.

The power supply side acquisition unit may issue an alarm when information indicating that at least one of the change amount and the change speed exceeds the threshold value is acquired.

Since the power supply side acquisition unit issues an alarm when the power supply side acquisition unit acquires information indicating that the change amount of the installation position of the power supply device exceeds a predetermined threshold value, an alarm is issued when the power supply device is moved significantly. As a result, an alarm can be issued when a major malfunction occurs in the power supply device or when a major disaster occurs around the power supply device. The same applies to the case where the power supply side acquisition unit acquires information indicating that the change speed of the installation position of the power supply device exceeds the predetermined threshold value, information indicating that the change amount of the posture of the power supply device exceeds the predetermined threshold value, and information indicating that the change speed of the posture of the power supply device exceeds the predetermined threshold value.

The power supply device may be connected to a server via a communication network, and the power supply device may further include a power supply side transmission unit that transmits the information related to the position to the server via the communication network.

Since the power supply device transmits information related to the position of the own device to the server, the server can easily acquire information related to the position of the power supply device, so that the power supply device can be managed appropriately.

The power supply side transmission unit may transmit information indicating at least one of an installation position and a posture of the power supply device as the information related to the position to the server.

If the power supply device transmits information indicating the installation position of the own device to the server, the server can acquire information indicating the installation position of the power supply device, so that the server can grasp the installation position of the power supply device, and therefore, the power supply device can be easily maintained and replaced. If the power supply device transmits information indicating the posture of the own device to the server, the server can acquire information indicating the posture of the power supply device, so that the server can grasp that the power supply device is tilted or inverted, and therefore, it can be used as an index as to whether or not a malfunction occurs in the power supply device. Thereby, the power supply device can be managed appropriately.

The power supply side transmission unit may transmit information indicating at least one of a change amount and a change speed of at least one of an installation position and a posture of the power supply device as the information related to the position to the server.

If the power supply device transmits information indicating the change amount of the installation position of the own device to the server, the server can acquire information indicating the change amount of the installation position of the power supply device, so that whether or not the power supply device is moved and the movement amount can be grasped. If the server can grasp whether or not the power supply device is moved and the movement amount, it can be used as an index for determining whether or not a malfunction occurs in the power supply device, whether or not a disaster occurs around the power supply device, or how large the disaster is. The same applies to the case where the server can acquire information indicating the change speed of the installation position of the power supply device, information indicating the change amount of the posture of the power supply device, and information indicating the change speed of the posture of the power supply device.

The power supply side transmission unit may transmit information indicating whether or not at least one of a change amount and a change speed of at least one of an installation position and a posture of the power supply device exceeds a predetermined threshold value as the information related to the position to the server.

If the power supply device transmits information indicating whether or not the change amount of the installation position of the own device exceeds the predetermined threshold value to the server, the server can acquire information indicating whether or not the change amount of the installation position of the power supply device exceeds the predetermined threshold value, so that whether or not the power supply device is moved significantly can be grasped. If the server can grasp whether or not the power supply device is moved significantly, it can be used as an index for determining whether or not a major malfunction occurs in the power supply device, whether or not a major disaster occurs around the power supply device, and the like. The same applies to the case where the server can acquire information indicating whether or not the change speed of the installation position of the power supply device exceeds the predetermined threshold value, information indicating whether or not the change amount of the posture of the power supply device exceeds the predetermined threshold value, and information indicating whether or not the change speed of the posture of the power supply device exceeds the predetermined threshold value.

The power supply side transmission unit may issue an alarm to the server when at least one of the change amount and the change speed exceeds the threshold value.

The power supply side transmission unit issues an alarm to the server when the change amount of the installation position of the power supply device exceeds a predetermined threshold value, so that an alarm is issued to the server when the power supply device is moved significantly. As a result, an alarm can be issued to the server when a major malfunction occurs in the power supply device or when a major disaster occurs around the power supply device. The same applies to the case where the change speed of the installation position of the power supply device exceeds the predetermined threshold value, the case where the change amount of the posture of the power supply device exceeds the predetermined threshold value, and the case where the change speed of the posture of the power supply device exceeds the predetermined threshold value.

The power supply side acquisition unit may acquire the information related to the position using GPS (Global Positioning System).

Since the power supply device acquires information related to the position using GPS, the information related to the position of the power supply device can be accurately grasped. For example, even when the area indicated by the address registered as the installation position of the power supply device is very wide, the server can acquire information related to the accurate position of the power supply device, so that the power supply device can be managed appropriately.

The power supply device may be an uninterruptible power supply system.

Since uninterruptible power supply systems for cable television, surveillance camera, and the like are installed at various locations outdoors, it is difficult to grasp the installation positions. Information related to the position of the uninterruptible power supply system is acquired, so that the uninterruptible power supply system can be managed appropriately.

A power supply device which is connected to a server via a communication network includes: a power supply side acquisition unit that acquires information related to a position of the power supply device; and a power supply side transmission unit that transmits the information related to the position to the server via the communication network.

The power supply device acquires information related to the position of the own device, and transmits the information related to the position to the server via the communication network. Thereby, the power supply device transmits the information related to the position to the server. Since the server can easily grasp the information related to the position of the power supply device, the power supply device can be managed appropriately.

A server which is connected to a power supply device via a communication network includes: a server side transmission unit that transmits a signal that requests acquisition of the information related to the position of the power supply device to the power supply device via the communication network; and a server side acquisition unit that acquires the information related to the position from the power supply device via the communication network.

The server requests the power supply device to allow the server to acquire the information related to the position via the communication network, and acquires the information related to the position from the power supply device. The server can easily grasp the information related to the position of the power supply device by acquiring the information related to the position from the power supply device, so that the power supply device can be managed appropriately.

The server side acquisition unit may acquire map information associated with identification information on the power supply device, compare the acquired information related to the position with the map information, and specify the identification information on the power supply device having the information related to the position.

The server compares the information related to the position of the power supply device with the map information, and specifies the identification information on the power supply device. The server grasps which power supply device is to be managed and where the power supply device is by associating the information related to the position with the identification information (automatic registration without manual input). The power supply device can be managed easily and appropriately.

The server side acquisition unit may periodically acquire the information related to the position from the power supply device via the communication network.

The server periodically acquires the information related to the position from the power supply device. Even when the installation position of the power supply device is changed, the server can acquire the information related to the position after the change, so that the information related to the position of the power supply device can be easily grasped. Even if there is a relocation of the power supply device which is not grasped by an administrator, information related to the latest position can be recognized, thereby being capable of preventing the situation where maintenance or the like cannot be performed because the position of the power supply device cannot be specified. Even when the power supply device is moved due to a disaster or the like, it is possible to grasp the state of the power supply device. In this way, the power supply device can be managed easily and appropriately.

The server side acquisition unit may acquire device information including a manufacturing time of the power supply device from the power supply device via the communication network.

When the server acquires device information including the manufacturing time of the power supply device, the server can manage the manufacturing time of the power supply device. Thereby, since the server can grasp the maintenance and replacement time of the power supply device, it is possible to prevent the time of maintenance and the like from being missed because the position of the power supply device cannot be specified. In this way, the power supply device can be managed easily and appropriately.

A power supply device management system includes: a server; and a power supply device connected to the server via a communication network, in which the power supply device includes a power supply side acquisition unit that acquires information related to a position of the power supply device, and in which the server includes a server side acquisition unit that acquires the information related to the position from the power supply device via the communication network.

In the power supply device management system, the power supply device acquires information related to the position of the own device, and the server acquires information related to the position from the power supply device via the communication network. When information related to the position of the power supply device is unknown, the server acquires the information related to the position from the power supply device, so that the server can easily grasp the information related to the position of the power supply device, and therefore, the power supply device can be managed appropriately.

A power supply device, a server, and a power supply device management system according to an embodiment of the present invention will be described with reference to the drawings. The embodiment described below describes a comprehensive or specific example. The numerical values, shapes, materials, components, positions for disposing the components and connection forms of the components, steps in the method, order of steps, and the like described in the following embodiment are merely examples, and are not intended to limit the present invention. Among the components in the following embodiment, components that are not described in the independent claim indicating the highest concept are described as optional components.

Embodiment

A schematic configuration of a power supply device management system 1 will be described. FIG. 1 is a schematic diagram illustrating a schematic configuration of the power supply device management system 1.

The power supply device management system 1 is a system that manages power supply devices 20 by a server 10. As illustrated in FIG. 1, the server 10, the power supply devices 20, a communication network 30, and a map management device 40 are provided. The server 10, the power supply devices 20, and the map management device 40 are connected via the communication network 30, and the power supply device management system 1 manages the power supply devices 20 in such a manner that the server 10 acquires various types of information from the power supply devices 20 and the map management device 40 via the communication network 30. Each of these components will be described in detail.

The server 10 is a computer connected to the power supply devices 20 and the map management device 40 via the communication network 30, and is used to manage the power supply devices 20. Specifically, the server 10 acquires information from the power supply devices 20 and the map management device 40 via the communication network 30, and manages the power supply devices 20. The server 10 may be a dedicated computer for managing the power supply devices 20 or a general-purpose personal computer. The detailed configuration of the server 10 will be described later.

The power supply devices 20 are each connected to the server 10 via the communication network 30, and transmit information related to the own device to the server 10. The power supply device 20 has a power supply and supplies power to other facilities. In this embodiment, the power supply device 20 is a power supply device used as a backup power supply. Specifically, the power supply device 20 is an uninterruptible power supply system that supplies power in the event of a power failure. Specifically, the power supply device 20 includes an energy storage device that is connected to an external power supply such as a commercial power supply and is supplied with power from the external power supply. In normal times, power is supplied to a load while a storage battery is floatingly charged, and power is supplied from the storage battery during a power failure. In this embodiment, the power supply device 20 is an uninterruptible power supply system for cable television having a nonaqueous electrolyte secondary battery such as a lithium ion battery as the energy storage device.

When the power supply from the external power supply to the power supply device 20 and external devices to which the power supply device 20 is connected is interrupted, the energy storage device provided in the power supply device 20 supplies power to processing units included in the power supply device 20 and the external devices. In this embodiment, the external devices are a cable television node amplifier 51, an amplifier 53, and the like, which will be described later. The processing units included in the power supply device 20 are a power supply side acquisition unit 21, a power supply side transmission unit 22, a power supply side storage unit 23, and the like, which will be described later. The energy storage device is not limited to the nonaqueous electrolyte secondary battery. The energy storage device is, for example, a secondary battery other than the nonaqueous electrolyte secondary battery, a capacitor, a primary battery that can use stored power without being charged by a user, or a battery using a solid electrolyte.

The power supply device 20 is not limited to an uninterruptible power supply system for cable television, and may be an uninterruptible power supply system for any application or a power supply device other than the uninterruptible power supply system. Although the plurality of power supply devices 20 are illustrated in FIG. 1, the power supply device management system 1 may include only one power supply device 20. The detailed configuration of the power supply device 20 will be described later.

The communication network 30 is an internet network, and in this embodiment, is an optical fiber and a coaxial cable (such as an optical fiber 31 and a coaxial cable 20b illustrated in FIG. 2 described later). The communication network 30 may be a wired LAN (Local Area Network), a wireless LAN, a mobile phone network (3G, LTE, etc.), or power line communication.

The map management device 40 is a computer connected to the server 10 via the communication network 30. The map management device 40 stores map information and transmits the map information to the server 10 via the communication network 30. Identification information on the power supply device 20 is associated with the map information. For example, characters (PS1, PS2, etc.) and symbols for identifying the power supply device 20 are plotted at registered positions on the map. The map management device 40 may be a dedicated computer storing map information or a general-purpose personal computer.

The configuration of the power supply device 20 will be described in detail. FIG. 2 is a schematic diagram illustrating a configuration around the power supply device 20. FIG. 3 is a front view illustrating an example of a state in which the power supply device 20 is installed.

Figure 2:
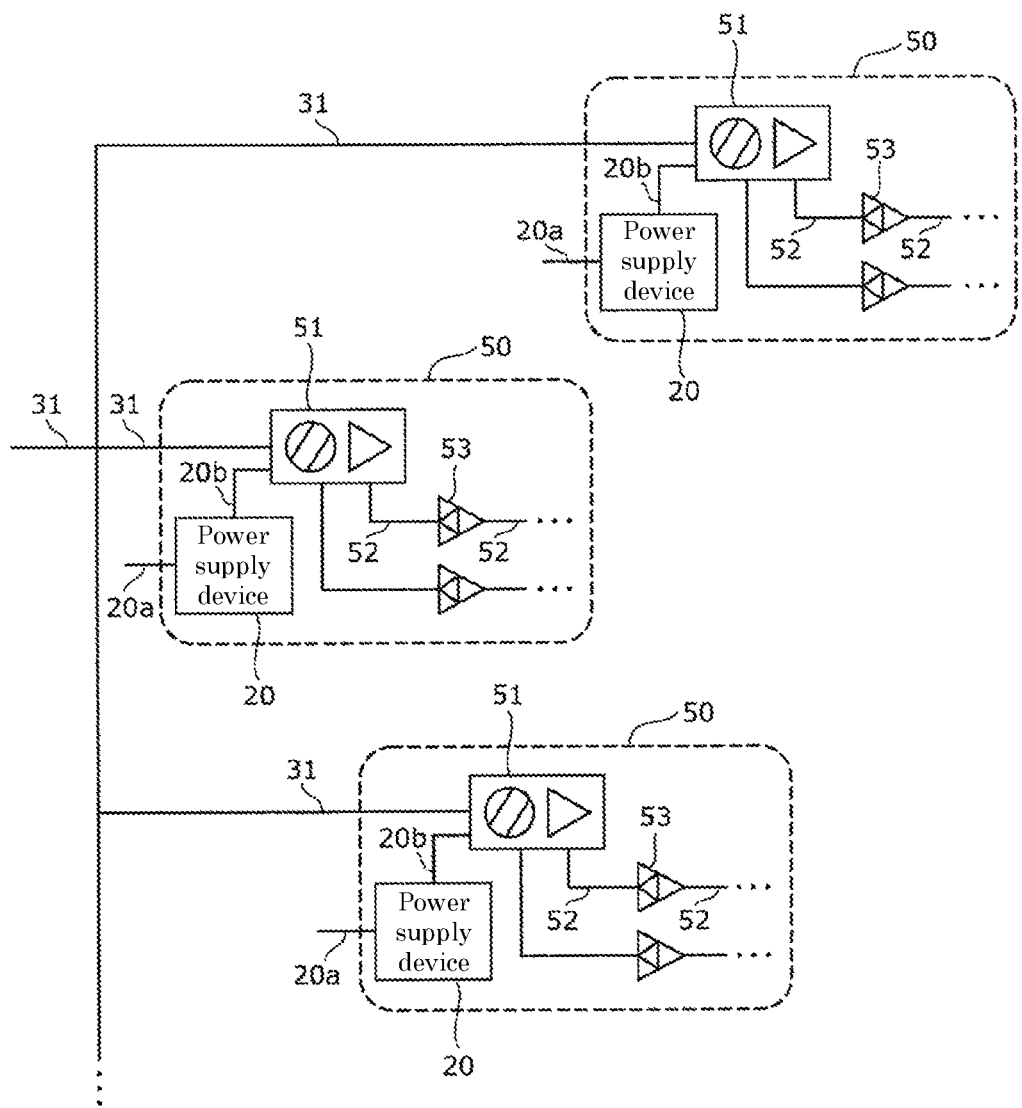
FIG. 2 is a schematic diagram illustrating a configuration around a power supply device.
Figure 3:
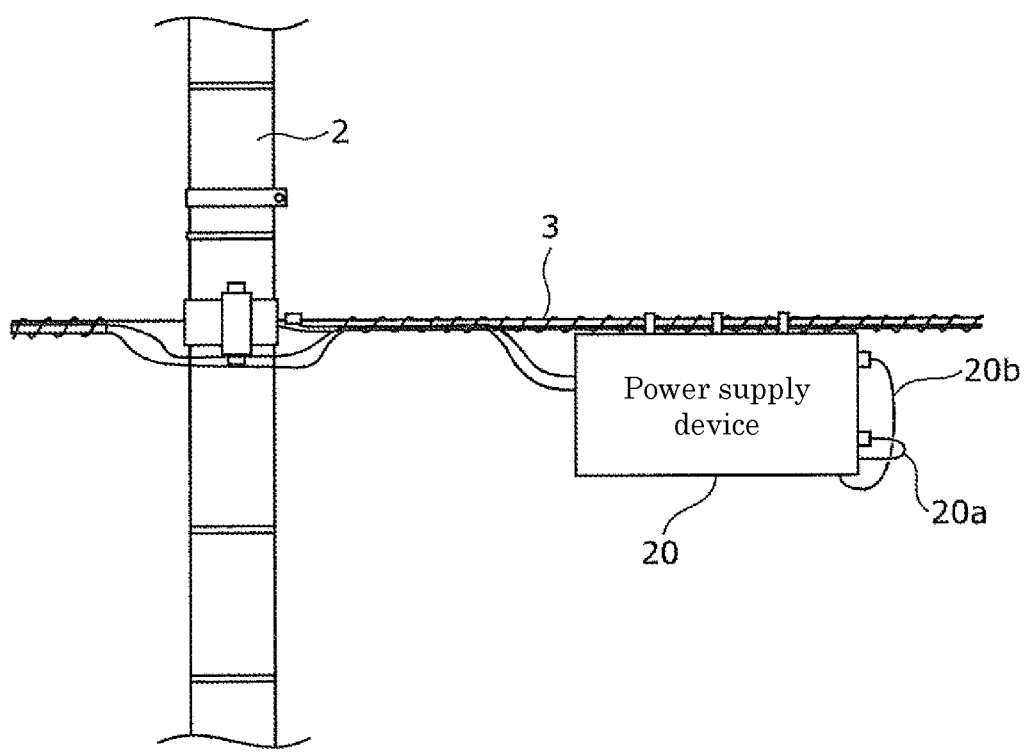
FIG. 3 is a front view illustrating an example of a state in which the power supply device is installed.

As illustrated in FIG. 2, one power supply device 20, one node amplifier 51, and a plurality of amplifiers 53 are provided for one node 50. Each power supply device 20 is connected with a power line 20a to which power such as commercial power is supplied from an external power supply such as a commercial power supply, and a coaxial cable 20b for outputting power and various types of information. In each node 50, the power supply device 20 and the node amplifier 51 are connected by the coaxial cable 20b. In each node 50, the node amplifier 51 and the amplifier 53 are connected by a coaxial cable 52. The coaxial cable 52 extends to each home. Each node amplifier 51 is connected with the optical fiber 31.

The information transmitted by the optical fiber 31 is transmitted to each home by the coaxial cable 52 through the node amplifier 51 and the amplifier 53. The power supplied to the power supply device 20 via the power line 20a is supplied to the node amplifier 51 via the coaxial cable 20b and supplied to each amplifier 53 via the coaxial cable 52. When power is not supplied from the power line 20a to the power supply device 20 due to a power failure or the like, power is supplied to the node amplifier 51 and each amplifier 53 from the power supply (energy storage device) such as a lithium ion battery included in the power supply device 20. The power supply device 20 is an uninterruptible power supply system for cable television including a power supply such as a lithium ion battery, and thousands of power supply devices 20 are disposed corresponding to thousands of nodes 50.

The server 10 is connected to the optical fiber 31. The coaxial cable 20b and the optical fiber 31 constitute the communication network 30, and the power supply device 20 and the server 10 are connected via the communication network 30.

As illustrated in FIG. 3, the power supply device 20 is disposed in the vicinity of a power pole 2, is fixed to a messenger wire 3 that supports a cable, and is installed in air. The position for disposing the power supply device 20 is not limited to the position illustrated in FIG. 3, and may be fixed to a brace attached to the power pole 2 or may be attached to a self-supporting pillar. The power supply devices 20 may be placed on the ground, not in the air, or may be placed indoors. Since thousands of power supply devices 20 are installed at various positions, it is difficult to perform maintenance or the like unless the installation positions are managed.

Figure 4:
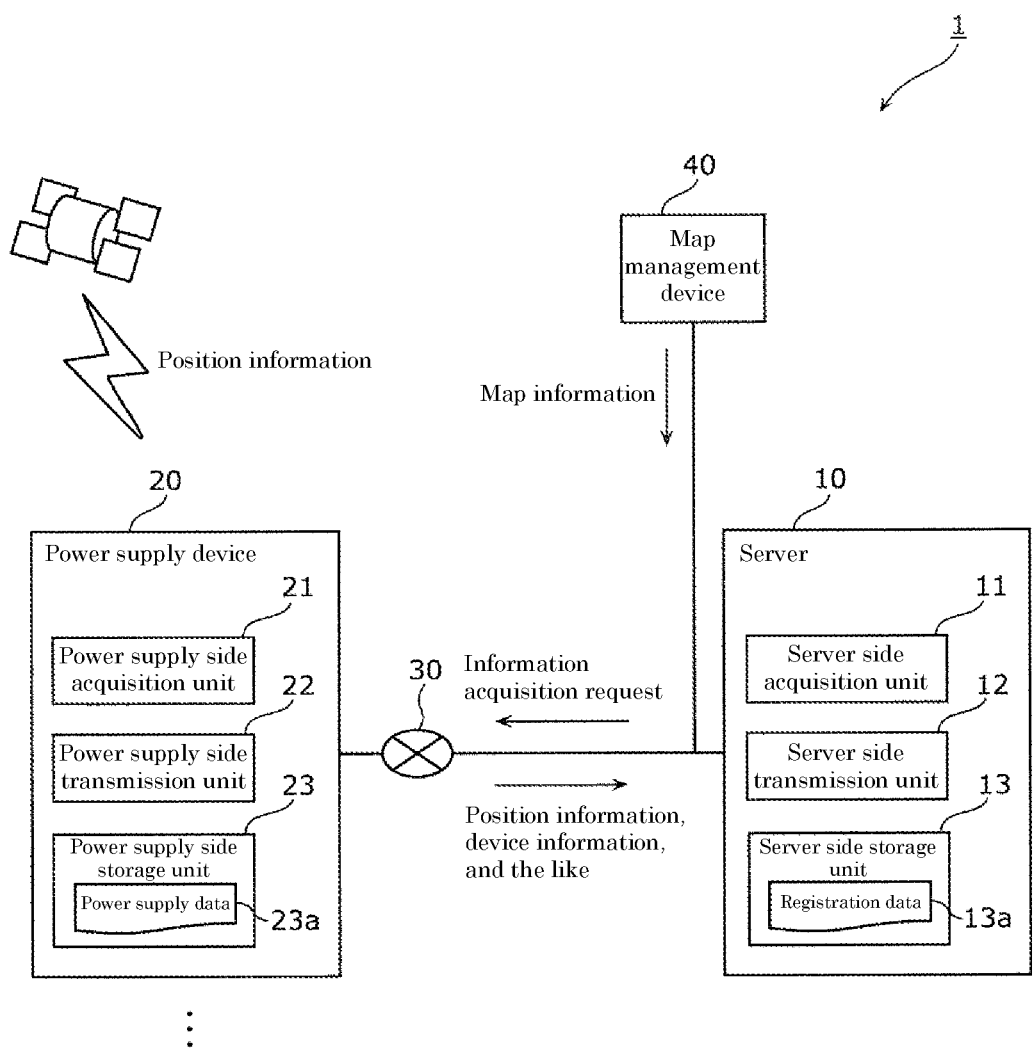
FIG. 4 is a block diagram illustrating functional configurations of a server and the power supply device included in the power supply device management system.

The detailed functional configuration of the server 10 and the power supply device 20 included in the power supply device management system 1 will be described. FIG. 4 is a block diagram illustrating functional configurations of the server 10 and the power supply device 20 included in the power supply device management system 1.

As illustrated in FIG. 4, the server 10 includes a server side acquisition unit 11, a server side transmission unit 12, and a server side storage unit 13. The power supply device 20 includes the power supply side acquisition unit 21, the power supply side transmission unit 22, and the power supply side storage unit 23. The server side storage unit 13 and the power supply side storage unit 23 are recording media that store various data for managing the power supply device 20, and store registration data 13a and power supply data 23a, respectively. As the recording medium, various conventionally known media such as a built-in or external memory, HDD (magnetic recording device), and the like can be used.

The power supply data 23a stored in the power supply side storage unit 23 and the registration data 13a stored in the server side storage unit 13 will be described. FIG. 5 is a diagram showing an example of the power supply data 23a stored in the power supply side storage unit 23. FIG. 6 is a diagram showing an example of the registration data 13a stored in the server side storage unit 13.

As shown in FIG. 5, various types of information related to the power supply device 20 (information acquired by the power supply side acquisition unit 21) are written in the power supply data 23*a*. That is, a data table including various types of information such as "network setting information", "position information", "device information", and "state information" is written in the power supply data 23*a*.

In the "network setting information", information related to network settings such as the MAC address and IP address of the power supply device 20 is stored. In the "position information", information related to the position of the power supply device 20 such as the latitude and longitude of the position where the power supply device 20 is installed (installation position) is stored. In the "device information", information (battery information) of the battery (lithium ion battery) included in the power supply device 20 such as manufacture date, manufacturer name, model, and serial number, and information related to another device included in the power supply device 20, specifically, information (PS information) such as manufacture date, manufacturer name, model, and serial number are stored. In the "state information", information related to the state of the power supply device 20 such as battery voltage and output current of the power supply device 20 is stored. These pieces of information are updated or accumulated whenever changes are made.

As shown in FIG. 6, information acquired by the server 10 regarding the power supply device 20 (information acquired by the server side acquisition unit 11) is written in the registration data 13*a*. In other words, a data table in which various types of information such as "network setting information", "position information", "device information", "alarm value", "registration history", and "maintenance information" are associated with "identification information" is written.

In the "identification information", information such as characters and symbols for identifying the power supply device 20 (or the node 50) is stored. Information similar to that in the power supply data 23*a* is stored in the "network setting information", the "position information", and the "device information". In the "position information", address information obtained from the latitude and longitude is added and stored. In the "alarm value", information related to alarm detection setting values such as a battery voltage threshold value and an output current threshold value corresponding to the performance of the power supply device 20 is stored. In the "registration history", the date on which information such as information registration date and information update date is automatically registered or automatically updated is stored. In the "maintenance Information", the date on which the power supply device 20 is newly installed (date on which the information is automatically registered) is stored as the power supply device installation date, and the date on which the battery information in the "device information" is changed is stored as the battery replacement date. These pieces of information are updated or accumulated whenever changes are made.

In FIG. 4, the processing units of the power supply device 20 will be described. The power supply side acquisition unit 21 acquires position information on the power supply device 20. Specifically, the power supply side acquisition unit 21 acquires the position information using GPS (Global Positioning System). That is, the power supply side acquisition unit 21 has a GPS function and acquires position information including the latitude and longitude of the own device. The power supply side acquisition unit 21 writes the acquired position information (latitude and longitude) in the power supply data 23*a* stored in the power supply side storage unit 23, and updates the data of "position information". As long as the power supply side acquisition unit 21 can acquire accurate position information, the acquisition means is not limited to GPS.

The power supply side acquisition unit 21 acquires state information on the power supply device 20 such as battery voltage and output current of the power supply device 20. The power supply side acquisition unit 21 writes the acquired state information in the power supply data 23*a* and updates the data of "state information". For other information, the power supply side acquisition unit 21 acquires information after the change if there is a change, writes the acquired information in the power supply data 23*a*, and updates the data.

The power supply side acquisition unit 21 may acquire information such as position information at any timing to update the data of the power supply data 23*a*. In this embodiment, the power supply side acquisition unit 21 periodically acquires information such as position information and updates the data of the power supply data 23*a*. The term "periodically" may refer to any period such as daily, weekly, monthly, or yearly, and is appropriately determined by a user (administrator). When there is no change in the acquired information, the power supply side acquisition unit 21 does not need to update the data of the power supply data 23*a*. The power supply side acquisition unit 21 may change the acquisition cycle according to the information, such as acquiring information that is changed less frequently in a long cycle.

The power supply side transmission unit 22 transmits the position information to the server 10 via the communication network 30. Specifically, the power supply side transmission unit 22 reads out the position information on the power supply device 20 from the power supply data 23*a* stored in the power supply side storage unit 23, and transmits the position information to the server 10 via the communication network 30. The power supply side transmission unit 22 also reads out device information and state information on the power supply device 20 and other information from the power supply data 23*a*, and transmits the information to the server 10 via the communication network 30.

The power supply side transmission unit 22 may transmit information such as position information to the server 10 at any timing. In this embodiment, the power supply side transmission unit 22 transmits information such as position information to the server 10 based on a request from the server 10. The power supply side transmission unit 22 may transmit information such as position information to the server 10 at a predetermined timing such as periodically, without being based on a request from the server 10. When there is no change in the information to be transmitted, the power supply side transmission unit 22 may not transmit the information to the server 10.

The processing units of the server 10 will be described. The server side transmission unit 12 transmits a signal that requests acquisition of position information on the power supply device 20 to the power supply device 20 via the communication network 30. Specifically, the server side transmission unit 12 transmits to the power supply device 20 an information acquisition request signal that requests acquisition of various types of information such as position information, device information, and state information on the power supply device 20.

The server side transmission unit 12 may transmit the information acquisition request signal to the power supply device 20 at any timing. In this embodiment, the server side transmission unit 12 periodically transmits the information acquisition request signal to the power supply device 20.

The term "periodically" may refer to any period such as daily, weekly, monthly, or yearly, and is appropriately determined by a user (administrator). The server side transmission unit 12 may change the cycle of transmitting the information acquisition request signal according to the information, such as transmitting the information acquisition request signal in a long cycle for information that is changed less frequently.

The server side acquisition unit 11 acquires various types of information such as position information, device information, and state information from the power supply device 20 via the communication network 30. As described above, the device information includes the manufacturing time (manufacturing date, etc.) of the power supply device 20. That is, the server side acquisition unit 11 acquires information transmitted in response to the information acquisition request from the server side transmission unit 12 to the power supply device 20. In this embodiment, the server side acquisition unit 11 periodically acquires various types of information such as position information from the power supply device 20 via the communication network 30. The server side acquisition unit 11 writes the acquired position information, device information, and the like in the registration data 13a stored in the server side storage unit 13, and updates the registration data 13a. The server side acquisition unit 11 specifies an address from the acquired position information, and writes the specified address in the "position information" of the registration data 13a.

The server side acquisition unit 11 acquires map information associated with the identification information on the power supply device 20, compares the acquired position information with the map information, and specifies the identification information on the power supply device 20 having the position information. That is, the server side acquisition unit 11 acquires map information from the map management device 40 via the communication network 30. The server side acquisition unit 11 compares the position indicated by the acquired position information on the power supply device 20 with the position of the power supply device 20 described in the map information, and associates the position information on the power supply devices 20 with identification information on the power supply device 20 associated with the map information. Thereby, the server side acquisition unit 11 specifies the identification information on the power supply device 20 having the position information. For example, the server side acquisition unit 11 specifies that the identification information on the power supply device 20 that has transmitted the position information is "PS1". The server side acquisition unit 11 writes the specified identification information in the "identification information" of the registration data 13a.

The server side acquisition unit 11 sets an alarm value corresponding to the acquired device information for each power supply device 20. That is, the server side acquisition unit 11 sets the battery voltage threshold value and the output current threshold value of the power supply device 20 with reference to the battery information and PS information included in the device information on the power supply device 20. The server side acquisition unit 11 writes the set alarm value in the "alarm value" of the registration data 13a.

The server side acquisition unit 11 writes the date on which the information on the power supply device 20 is acquired and the date on which the information on the power supply device 20 is updated as the information registration date and the information update date in the "registration history" of the registration data 13a. The server side acquisition unit 11 writes the date on which the information on the power supply device 20 is automatically registered and the date on which the battery information of the "device information" is changed as the power supply device installation date and the battery replacement date in the "maintenance information" of the registration data 13a.

Figure 7:
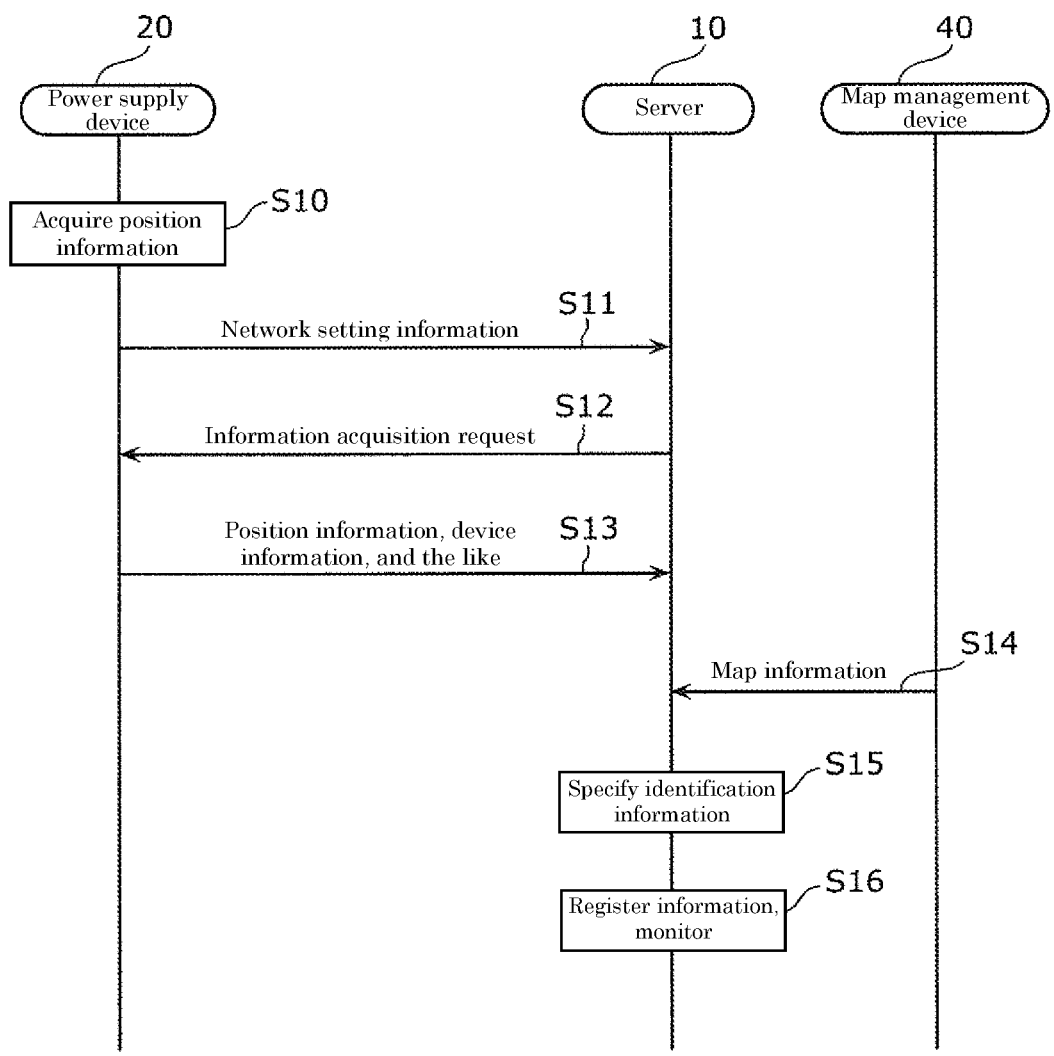
FIG. 7 is a sequence diagram showing an example of a process in which the power supply device management system manages the power supply device.

A process in which the power supply device management system 1 manages the power supply device 20 (process performed by the server 10 and the power supply device 20) will be described in detail. FIG. 7 is a sequence diagram showing an example of the process in which the power supply device management system 1 manages the power supply device 20.

As shown in FIG. 7, the power supply side acquisition unit 21 of the power supply device 20 acquires the position information on the own device (S10). Specifically, the power supply side acquisition unit 21 acquires the position information using GPS, and writes the position information in the power supply data 23a.

The power supply side transmission unit 22 of the power supply device 20 transmits network setting information to the server 10 via the communication network 30 (S11). Specifically, the power supply side transmission unit 22 reads out the network setting information from the power supply data 23a and transmits the information to the server 10. When the IP address of the server 10 is written in advance in the power supply side storage unit 23 of the power supply device 20 or the IP address of the server 10 is input by a user, the power supply side transmission unit 22 transmits the information to the server 10 specified with the IP address. The server side acquisition unit 11 of the server 10 acquires (receives) network setting information and writes the network setting information in the registration data 13a.

The server side transmission unit 12 of the server 10 refers to the network setting information of the registration data 13a, and transmits an information acquisition request signal for requesting acquisition of information on the power supply device 20 to the power supply device 20 via the communication network 30 (S12). The power supply side acquisition unit 21 of the power supply device 20 acquires (receives) the information acquisition request signal.

When the power supply side acquisition unit 21 receives the information acquisition request signal, the power supply side transmission unit 22 of the power supply device 20 transmits various types of information such as position information, device information, and state information to the server 10 via the communication network 30 (S13). Specifically, the power supply side transmission unit 22 reads out the various types of information from the power supply data 23a and transmits the information to the server 10. The server side acquisition unit 11 of the server 10 acquires (receives) the various types of information.

The server side acquisition unit 11 of the server 10 acquires map information from the map management device 40 via the communication network 30 (S14). The server side acquisition unit 11 compares the acquired position information with the map information, and specifies the identification information on the power supply device 20 having the position information (S15). When the server side acquisition unit 11 cannot specify the identification information on the power supply device 20, the server side acquisition unit 11 specifies the MAC address of the power supply device 20 as the identification information. That is, the power supply device 20 whose identification information specified by the server side acquisition unit 11 is the MAC address is found to have position information different from map information data, and thus, using the MAC address as the identification information, consistency check is also performed. The server side acquisition unit 11 writes the specified identification information in the registration data 13a.

Figure 8:
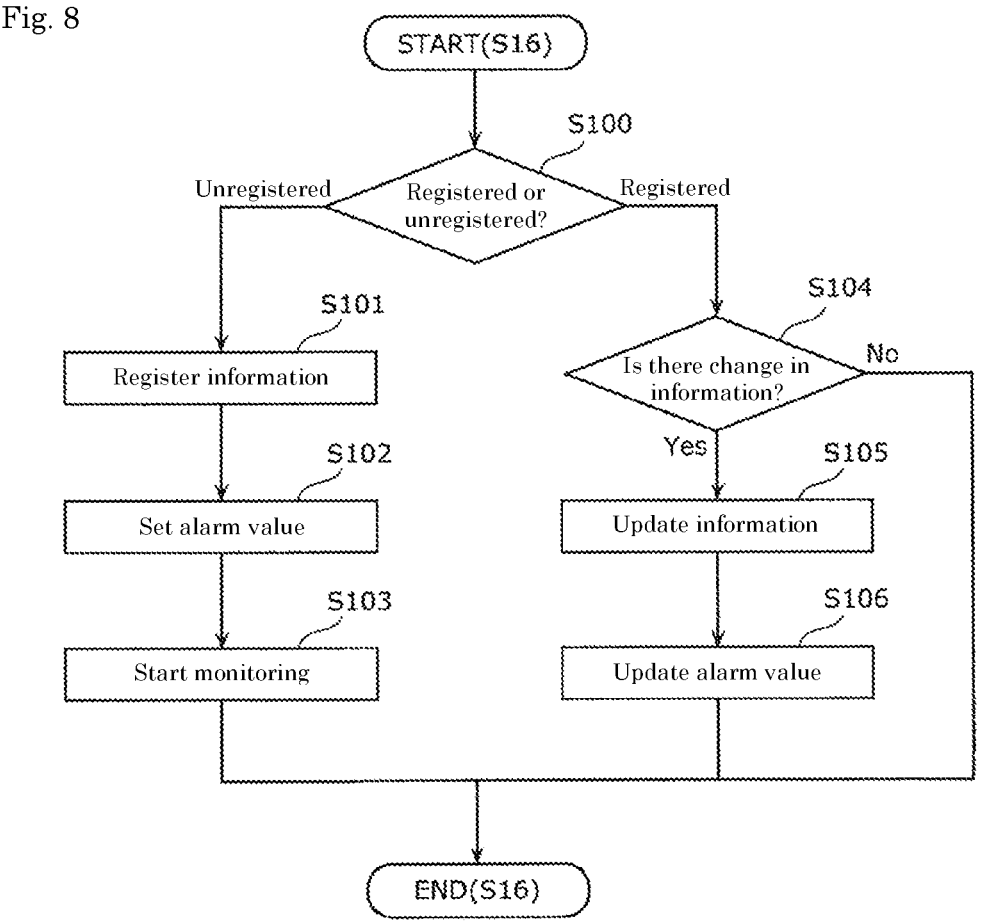
FIG. 8 is a flowchart showing an example of a process in which the server registers information on the power supply device and monitors the power supply device.

The server side acquisition unit 11 registers information on the power supply device 20 and monitors the power supply device 20 (S16). This process will be described in detail below. FIG. 8 is a flowchart showing an example of a process in which the server side acquisition unit 11 of the server 10 registers information on the power supply device 20 and monitors the power supply device 20.

As shown in FIG. 8, the server side acquisition unit 11 refers to the acquired MAC address of the power supply device 20, and determines whether or not the acquired information on the power supply device 20 has already been registered (written in the registration data 13a) (S100). Specifically, if the acquired MAC address of the power supply device 20 has already been written in the "network setting information" of the registration data 13a, the server side acquisition unit 11 determines that the information on the power supply device 20 has been registered. If the acquired MAC address of the power supply device 20 is not written in the "network setting information" of the registration data 13a, the server side acquisition unit 11 determines that the information on the power supply devices 20 is unregistered.

When the server side acquisition unit 11 determines that the information on the power supply device 20 is unregistered ("unregistered" in S100), the server side acquisition unit 11 registers the acquired information on the power supply device 20 (S101). That is, the server side acquisition unit 11 writes the acquired information on the power supply device 20 in the registration data 13a. The server side acquisition unit 11 sets an alarm value corresponding to the acquired device information for each power supply device 20 (S102). The server side acquisition unit 11 writes the set alarm value in the registration data 13a. The server side acquisition unit 11 starts monitoring the power supply device 20 with the set alarm value.

When the server side acquisition unit 11 determines that the information on the power supply device 20 has been registered ("registered" in S100), the server side acquisition unit 11 determines whether or not there is a change in the information (S104). When the server side acquisition unit 11 determines that there is a change in the information on the power supply device 20 ("Yes" in S104), the information on the power supply device 20 is updated (S105), and the alarm value is also updated (S106). That is, the server side acquisition unit 11 writes the acquired various types of information on the power supply device 20 and the updated alarm value in the registration data 13a, and updates the data. When the server side acquisition unit 11 determines that there is no change in the information on the power supply device 20 ("No" in S104), the process is terminated without updating the registration data 13a.

The process in which the server 10 registers the information on the power supply device 20 and monitors the power supply device 20 (S16 in FIG. 7) is terminated. When the acquired state information on the power supply device 20 is out of the set alarm value in the above-described process step, the server side acquisition unit 11 warns a user (administrator) by issuing an alarm or the like.

As described above, the power supply device 20 is used as a backup power supply, and includes the power supply side acquisition unit 21 that acquires the information related to the position of the power supply device 20, so that the information related to the position can be easily acquired. Therefore, it is possible to appropriately manage the power supply device 20 using the information related to the position.

When the power supply from the external power supply is interrupted, the power supply device 20 can supply power to the power supply side acquisition unit 21 and the external devices, so that it is possible to continuously acquire the information related to the position of the power supply device 20 while supplying power to the external devices. Thereby, the power supply device 20 can be managed appropriately.

Since the information indicating the installation position of the power supply device 20 can be acquired and the installation position of the power supply device 20 can be grasped, the power supply device 20 can be easily maintained or replaced. Thereby, the power supply device 20 can be managed appropriately.

Since the power supply device 20 acquires the information related to the position (position information) using GPS, the server 10 can acquire the position information based on GPS, and can accurately grasp the position of the power supply device 20. Even when the area indicated by the address registered as the installation position of the power supply device 20 is very wide, the server 10 can acquire accurate position information on the power supply device 20, so that the power supply device 20 can be managed appropriately.

The power supply device 20 is, for example, an uninterruptible power supply system. Uninterruptible power supply systems for cable television and the like are very numerous and are installed at various locations outdoors, so it is difficult to grasp the installation positions. When the server 10 acquires the position information from the uninterruptible power supply system, the server 10 can acquire the accurate position information on the uninterruptible power supply system, so that the uninterruptible power supply system can be managed appropriately.

The power supply device 20 acquires the position information (information indicating the installation position) on the own device, and transmits the position information to the server 10 via the communication network 30. If the power supply device 20 transmits the information indicating the installation position of the own device to the server 10, the server 10 can acquire information indicating the installation position of the power supply device 20. As a result, the server 10 can easily grasp the installation position of the power supply device 20 and can easily maintain or replace the power supply device 20, so that the power supply device 20 can be managed appropriately.

The server 10 requests the power supply device 20 to allow the server 10 to acquire position information via the communication network 30, and acquires the position information from the power supply device 20. Since the server 10 can easily grasp the position of the power supply device 20, the power supply device 20 can be managed appropriately.

The server 10 compares the position information on the power supply device 20 with the map information, and specifies the identification information on the power supply device 20. In other words, the server 10 grasps which power supply device 20 is to be managed and where the power supply device 20 is by associating the position information with the identification information (automatic registration without manual input). Thereby, the power supply device 20 can be managed easily and appropriately.

Since the server 10 can periodically acquire the position information from the power supply device 20, even when the installation position of the power supply device 20 is changed, the server 10 can acquire the position information after the change, so that the position information on the power supply device 20 can be easily grasped. As a result, even if there is a relocation of the power supply device 20 which is not grasped by an administrator, the latest position information can be recognized, thereby preventing the situation where maintenance or the like cannot be performed because the position of the power supply device 20 cannot be specified. Even when the power supply device 20 is moved due to a disaster or the like, it is possible to grasp the state of the power supply device 20. In this way, the power supply device 20 can be managed easily and appropriately.

When the server 10 acquires device information including the manufacturing time of the power supply device 20, the server 10 can manage the manufacturing time of the power supply device 20. Thereby, since the server 10 can grasp the maintenance and replacement time of the power supply device 20, it is possible to prevent the time of maintenance and the like from being missed because the position of the power supply device 20 cannot be specified. In this way, the power supply device 20 can be managed easily and appropriately.

By setting an alarm value corresponding to the power supply device 20 by the server 10, it is possible to grasp the malfunction status of the power supply device 20, the maintenance time of the power supply device 20, and the like, so that the power supply device 20 can be managed easily and appropriately.

The power supply device 20 acquires the position information on the own device, and the server 10 acquires the position information from the power supply device 20 via the communication network 30. As a result, even when the position of the power supply device 20 is unknown, the server 10 acquires the position information from the power supply device 20, so that the server 10 can easily grasp the position of the power supply device 20, and therefore, the power supply device 20 can be managed appropriately.

Although the power supply device management system 1, the power supply device 20, and the server 10 have been described, the present invention is not limited to this embodiment. In other words, the embodiment disclosed herein is illustrative in all respects and not restrictive. The scope of the present invention is defined by the scope of the claims, and includes meanings equivalent to the scope of the claims and all modifications within the scope. The modifications of the above-described embodiment will be described below.

In the above-described embodiment, the power supply device 20 is an uninterruptible power supply system for cable television, but is not limited to this. The power supply device 20 may be a backup power supply for traffic infrastructure such as surveillance cameras such as road surveillance cameras, railroad crossing surveillance cameras, river surveillance cameras, and sabo dam surveillance cameras, security cameras, and traffic lights, and large-scale facilities such as large factories and pipelines.

Specifically, the power supply device 20 may be a backup power supply for CCTV (Closed Circuit Television) cameras for disaster prevention, information bulletin boards, crossing gates, security surveillance cameras and recorder devices, outdoor wireless devices, outdoor communication devices, and access point devices for IoT (Internet of Things), or communication infrastructures (communication system) such as electric/wireless communication devices.

Examples of the CCTV cameras for disaster prevention include CCTV cameras for disaster prevention in rivers, roads, and coastal areas. Examples of the information bulletin boards include an LED (Light Emitting Diode) information bulletin boards and digital signages. Examples of the crossing gates include crossing gates provided in underpasses, parking lots, and the like. Examples of the security surveillance cameras and recorder devices include security monitoring cameras and recorder devices provided in parks, public facilities, venues, and the like. Examples of the outdoor wireless devices include public Wi-Fi (Wireless Fidelity), LPWA (Low Power Wide Area) base stations, and the like. Examples of the outdoor communication devices include outdoor ONU (Optical Network Unit) devices (optical line terminators), medicons (media converters), switches, and the like for small apartment buildings. Examples of the access point devices for IoT include data collection devices for various sensors.

The information related to the position of the power supply device 20 is described as the position information on the power supply device 20 (information indicating the installation position), but is not limited to this. This will be described in detail below.

(Modification 1 Regarding Information Related to Position of Power Supply Device 20)

Figure 9:
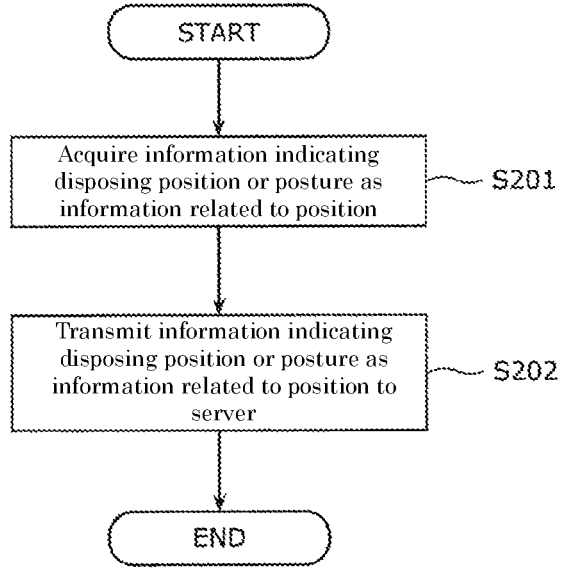
FIG. 9 is a flowchart showing an example of a process performed by the power supply device in Modification 1.

The information related to the position of the power supply device 20 may be information indicating the posture of the power supply device 20. FIG. 9 is a flowchart showing an example of a process performed by the power supply device 20 in Modification 1.

As shown in FIG. 9, the power supply side acquisition unit 21 of the power supply device 20 acquires information indicating at least one of the installation position and the posture of the power supply device 20 as information related to the position of the power supply device 20 (S201). The information indicating the posture of the power supply device 20 is information indicating the inclination state, the rotation state, the reverse state, and the like of the power supply device 20. The power supply side acquisition unit 21 can acquire information indicating the posture of the power supply device 20 using an inclination sensor or the like. The power supply side transmission unit 22 of the power supply device 20 transmits information indicating at least one of the installation position and the posture of the power supply device 20 as information related to the position to the server 10 (S202).

If information indicating the posture of the power supply device 20 can be acquired, it can be grasped that the power supply device 20 is tilted or inverted, so that it can be used as an index as to whether or not a malfunction occurs in the power supply device 20. For example, it is possible to grasp that the power supply device 20 has fallen and laid down or tilted due to an earthquake or the like, and the power supply device 20 can be managed appropriately.

If the power supply device 20 transmits the information indicating the posture of the own device to the server 10, the server 10 can acquire information indicating the posture of the power supply device 20. Therefore, the server 10 can grasp that the power supply device 20 is tilted or inverted, and the server 10 can be used as an index as to whether or not a malfunction occurs in the power supply device 20. Thereby, the power supply device 20 can be managed appropriately.

(Modification 2 Regarding Information Related to Position of Power Supply Device 20)

Figure 10:
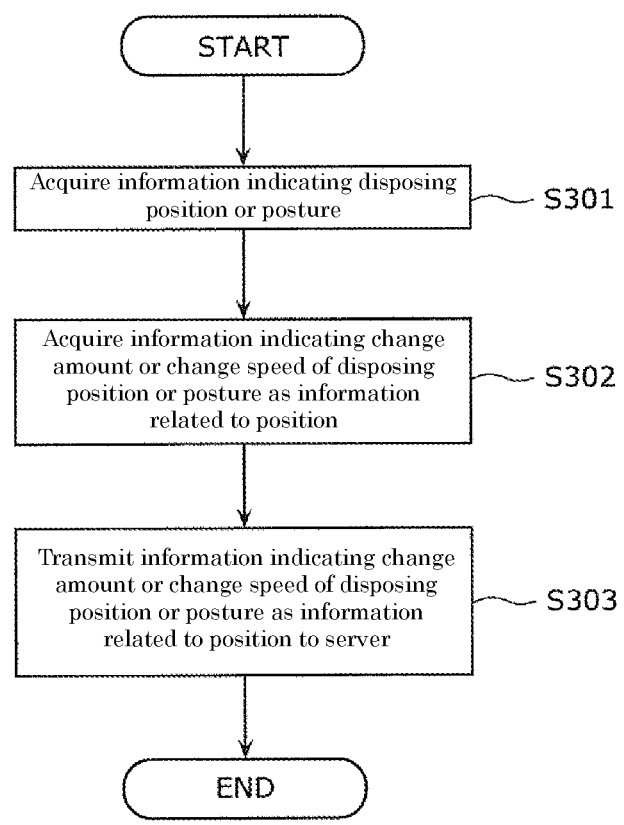
FIG. 10 is a flowchart showing an example of a process performed by the power supply device in Modification 2.

The information related to the position of the power supply device 20 may be information indicating at least one of the change amount and the change speed of at least one of the installation position and the posture of the power supply device 20. FIG. 10 is a flowchart showing an example of a process performed by the power supply device 20 in Modification 2.

As shown in FIG. 10, the power supply side acquisition unit 21 of the power supply device 20 acquires information indicating at least one of the installation position and the posture of the power supply device 20 (S301). The power supply side acquisition unit 21 calculates information indicating at least one of the change amount and the change speed of at least one of the installation position and the posture of the power supply device 20 using the acquired information. Thereby, the power supply side acquisition unit 21 acquires information indicating at least one of the change amount and the change speed of at least one of the installation position and the posture of the power supply device 20 as information related to the position of the power supply device 20 (S302). The power supply side transmission unit 22 transmits information indicating at least one of the change amount and the change speed of at least one of the installation position and the posture of the power supply device 20 as information related to the position to the server 10 (S303).

The information indicating the change amount of the installation position or the posture of the power supply device 20 is information indicating the movement amount (deviation amount) such as the installation position or the inclination of the power supply device 20, and is a difference between the two pieces of data indicating the installation position or the posture. The information indicating the changing speed of the installation position or the posture of the power supply device 20 is information indicating the moving speed of the movement amount (deviation amount), and when the power supply device 20 is shaken due to an earthquake or the like, it is the shaking speed. The power supply side acquisition unit 21 can acquire information indicating the change amount using an acceleration sensor, an angular velocity sensor, or the like.

If information indicating the change amount of the installation position of the power supply device 20 can be acquired, whether or not the power supply device 20 is moved and the movement amount can be grasped, so that it can be used as an index for determining whether or not a malfunction occurs in the power supply device 20, whether or not a disaster occurs around the power supply device 20, or how large the disaster is.

If the power supply device 20 transmits information indicating the change amount of the installation position of the own device to the server 10, the server 10 can acquire information indicating the change amount of the installation position of the power supply device 20, so that the server 10 can grasp whether or not the power supply device 20 is moved and the movement amount. If the server 10 can grasp whether or not the power supply device 20 is moved and the movement amount, the server 10 can use it as an index for determining whether or not a malfunction occurs in the power supply device 20, whether or not a disaster occurs around the power supply device 20, or how large the disaster is.

For example, when the power supply device 20 is installed in a surveillance camera, and a disaster such as an earthquake occurs and the video of the surveillance camera stops being displayed, if the above information on the power supply device 20 can be acquired, it can be determined how large the disaster around the surveillance camera is.

Even when the power supply device 20 is installed in the traffic light, and a disaster such as an earthquake occurs and the traffic light falls down, if the traffic light is operating, no measures may be taken as no abnormality. In this case, if the above information on the power supply device 20 installed in the traffic light can be acquired, it can be determined that the traffic light has fallen, so that the traffic light can be repaired promptly.

Even if the power supply device 20 is installed in the security camera and the position of the security camera is changed maliciously, if the above information on the power supply device 20 can be acquired, it can be determined that a malicious person may have entered, or the position of the security camera can be corrected quickly.

When the power supply device 20 is installed in a pipeline established on a vast land overseas, etc., if the above information on the power supply device 20 can be acquired even in the event of a disaster such as an earthquake, it is possible to quickly grasp that an abnormality occurs in the pipeline such as damage. Even in factories where there are few people coming and going due to automation, etc., if the power supply device 20 is installed, it is possible to quickly grasp that an abnormality occurs.

In recent years, the accuracy of position information that can be grasped by GPS has improved, and the above information on the power supply device 20 can be acquired with relatively high accuracy. Therefore, it can be determined to a certain degree of precision that the power supply device 20 is shaken by air or the like, or the power supply device 20 is moved due to a disaster or the like. These determinations may be made using AI (Artificial Intelligence). If it can be determined that the power supply device 20 is shaken by wind, the speed of the wind can also be grasped.

The case has been described above where information indicating the change amount of the installation position of the power supply device 20 can be acquired. The same applies to the case where information indicating the change speed of the installation position of the power supply device 20, information indicating the change amount of the posture of the power supply device 20, and information indicating the change speed of the posture of the power supply device 20 can be acquired.

(Modification 3 Regarding Information Related to Position of Power Supply Device 20)

Figure 11:
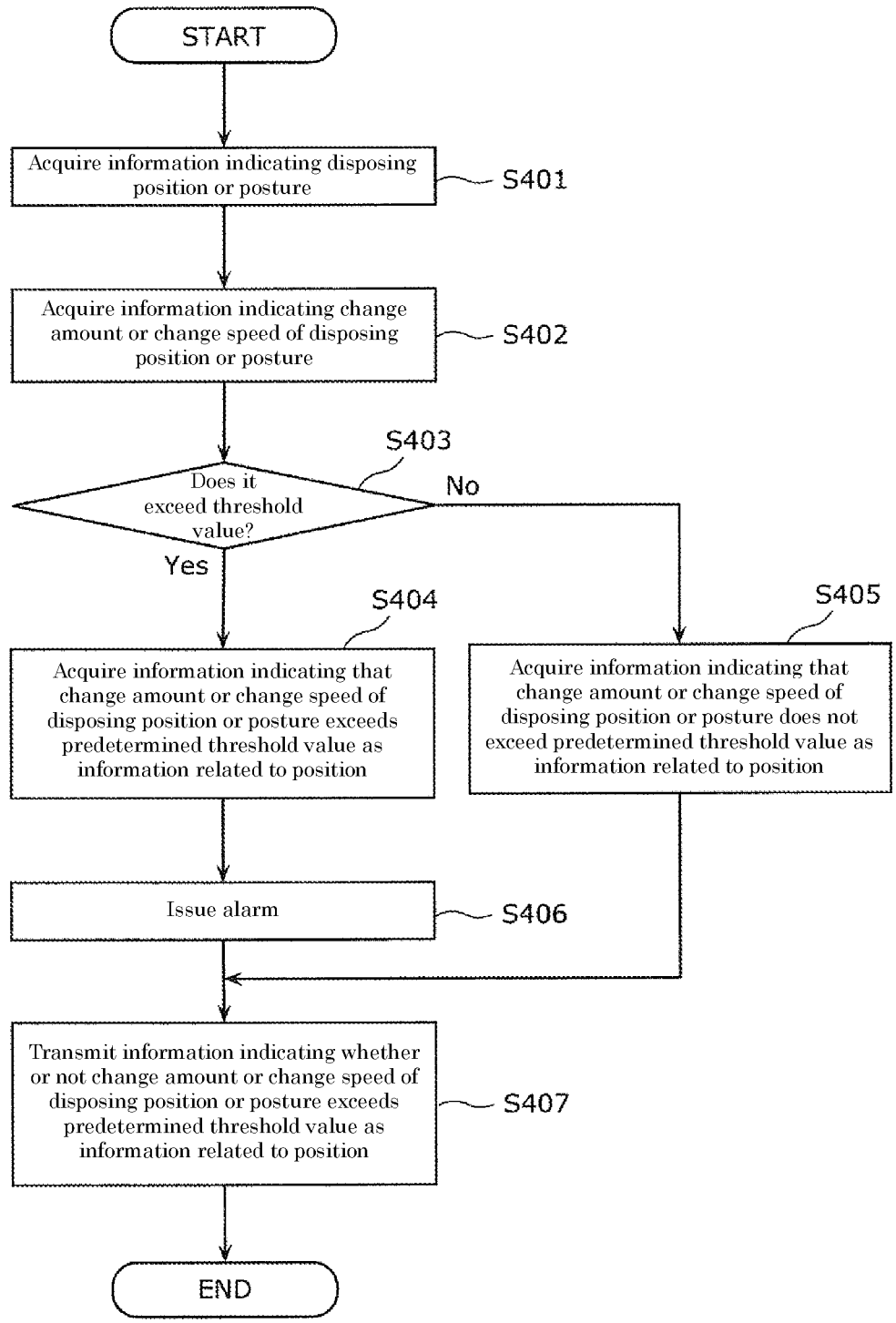
FIG. 11 is a flowchart showing an example of a process performed by the power supply device in Modification 3.

The information related to the position of the power supply device 20 may be information indicating whether or not at least one of the change amount and the change speed of at least one of the installation position and the posture of the power supply device 20 exceeds a predetermined threshold value. FIG. 11 is a flowchart showing an example of a process performed by the power supply device 20 in Modification 3.

As shown in FIG. 11, the power supply side acquisition unit 21 of the power supply device 20 acquires information indicating at least one of the installation position and the posture of the power supply device 20 (S401). The power supply side acquisition unit 21 calculates information indicating at least one of the change amount and the change speed of at least one of the installation position and the posture of the power supply device 20 using the acquired information. Thereby, the power supply side acquisition unit 21 acquires information indicating at least one of the change amount and the change speed of at least one of the installation position and the posture of the power supply device 20 (S402).

The power supply side acquisition unit 21 determines whether or not at least one of the change amount and the change speed exceeds a predetermined threshold value (S403). The predetermined threshold value may be appropriately determined according to the state of the power supply device 20 to be grasped.

When it is determined that at least one of the change amount and the change speed exceeds the threshold value (Yes in S403), the power supply side acquisition unit 21 acquires information indicating that at least of the change amount and the change speed exceeds the threshold value as information related to the position of the power supply device 20 (S404). When it is determined that at least one of the change amount and the change speed does not exceed the threshold value (No in S403), the power supply side acquisition unit 21 acquires information indicating that at least of the change amount and the change speed does not exceed the threshold value as information related to the position of the power supply device 20 (S405). As described above, the power supply side acquisition unit 21 acquires information indicating whether or not at least one of the change amount and the change speed of at least one of the installation position and the posture of the power supply device 20 exceeds the predetermined threshold value as information related to the position of the power supply device 20.

The power supply side acquisition unit 21 issues an alarm (S406) when information indicating that at least one of the change amount and the change speed exceeds the threshold value is acquired (S404). For example, when the power supply side acquisition unit 21 acquires the information, the power supply side acquisition unit 21 may issue an alarm, for example, by emitting a loud sound, emitting a high pitch sound, emitting conspicuous light such as red, emitting bright light, displaying a warning on the screen, or the like. The power supply side acquisition unit 21 may change the loudness or pitch (frequency) of sound, the color or brightness of light, the display mode on the screen, and the like according to the degree of disaster.

Then, the power supply side transmission unit 22 of the power supply device 20 transmits information indicating whether or not at least one of the change amount and the change speed of at least one of the installation position and the posture of the power supply device 20 exceeds the predetermined threshold value as information related to the position to the server 10 (S407).

If information indicating whether or not the change amount of the installation position of the power supply device 20 exceeds the predetermined threshold value can be acquired, it can be grasped whether or not the power supply device 20 is moved significantly. For this reason, it can be used as an index for determining whether or not a major malfunction occurs in the power supply device 20, whether or not a major disaster occurs around the power supply device 20, and the like.

If the power supply device 20 transmits information indicating whether or not the change amount of the installation position of the own device exceeds the predetermined threshold value to the server 10, the server 10 can acquire information indicating whether or not the change amount of the installation position of the power supply device 20 exceeds the predetermined threshold value. Therefore, the server 10 can grasp whether or not the power supply device 20 is moved significantly. If the server 10 can grasp whether or not the power supply device 20 is moved significantly, the server 10 can use it as an index for determining whether or not a major malfunction occurs in the power supply device 20, whether or not a major disaster occurs around the power supply device 20, and the like. Specific examples are as described above.

The same applies to the case where information indicating whether or not the change speed of the installation position of the power supply device 20 exceeds the predetermined threshold value, information indicating whether or not the change amount of the posture of the power supply device 20 exceeds the predetermined threshold value, and information indicating whether or not the change speed of the posture of the power supply device 20 exceeds the predetermined threshold value can be acquired.

Since the power supply side acquisition unit 21 has a function of determining whether or not the change amount of the installation position of the power supply device 20 exceeds the predetermined threshold value, information indicating whether or not the change amount of the installation position of the power supply device 20 exceeds the predetermined threshold value can be easily acquired. The same applies to the case where the power supply side acquisition unit 21 acquires information indicating whether or not the change speed of the installation position of the power supply device 20 exceeds the predetermined threshold value, information indicating whether or not the change amount of the posture of the power supply device 20 exceeds the predetermined threshold value, and information indicating whether or not the change speed of the posture of the power supply device 20 exceeds the predetermined threshold value.

The power supply side acquisition unit 21 issue an alarm when the power supply side acquisition unit 21 acquires information indicating that the change amount of the installation position of the power supply device 20 exceeds a predetermined threshold value, so that an alarm is issued when the power supply device 20 is moved significantly. As a result, an alarm can be issued when a major malfunction occurs in the power supply device 20 or when a major disaster occurs around the power supply device 20. The same applies to the case where the power supply side acquisition unit 21 acquires information indicating that the change speed of the installation position of the power supply device 20 exceeds the predetermined threshold value, information indicating that the change amount of the posture of the power supply device 20 exceeds the predetermined threshold value, and information indicating that the change speed of the posture of the power supply device 20 exceeds the predetermined threshold value.

The power supply side acquisition unit 21 does not have to issue an alarm. The power supply side transmission unit 22 of the power supply device 20 may issue an alarm (transmit a signal indicating an alarm) to the server 10 when at least one of the change amount and the change speed exceeds the threshold value.

The power supply side transmission unit 22 issues an alarm to the server 10 when the change amount of the installation position of the power supply device 20 exceeds a predetermined threshold value, so that an alarm is issued to the server 10 when the power supply device 20 is moved significantly. As a result, an alarm can be issued to the server 10 when a major malfunction occurs in the power supply device 20 or when a major disaster occurs around the power supply device 20.

When the server 10 receives an alarm from the power supply device 20, the server 10 may issue an alarm, for example, by emitting a loud sound, emitting a high pitch sound, emitting conspicuous light such as red, emitting bright light, displaying a warning on the screen, or the like. The server 10 may change the loudness or pitch of sound, the color or brightness of light, the display mode on the screen, and the like according to the degree of disaster.

The same applies to the case where the change speed of the installation position of the power supply device 20 exceeds the predetermined threshold value, the case where the change amount of the posture of the power supply device 20 exceeds the predetermined threshold value, and the case where the change speed of the posture of the power supply device 20 exceeds the predetermined threshold value.

Other Modifications

In the above-described embodiment and its modifications, the power supply device 20 is a power supply device used as a backup power supply. However, the power supply device 20 may be a power supply device other than the backup power supply.

In the above-described embodiment and its modifications, the power supply device 20 transmits the information related to the acquired position of the power supply device 20 to the server 10, but the present invention is not limited to this, and the power supply device 20 may not transmit the information to the server 10. Even in this case, the power supply device 20 produces an effect such as being able to appropriately manage the power supply device 20 by issuing an alarm based on the acquired information.

In the above-described embodiment and its modifications, the power supply device 20 and the server 10 include the power supply side storage unit 23 and the server side storage unit 13, and various types of information are stored in the power supply side storage unit 23 and the server side storage unit 13. However, the information stored in the power supply side storage unit 23 and the server side storage unit 13 is not limited to the above information. Alternatively, the power supply device 20 and the server 10 may not include the power supply side storage unit 23 and the server side storage unit 13, and may use a recording medium of an external device instead of the power supply side storage unit 23 and the server side storage unit 13.

The processing units included in the power supply device management system 1, the power supply device 20, or the server 10 can each also be realized as an LSI (Large Scale Integration) that is an integrated circuit. Each processing unit included in the integrated circuit may be individually made into one chip, or may be made into one chip so as to include a part or all of them. The name used here is LSI, but it may also be called IC, system LSI, super LSI, or ultra LSI depending on the degree of integration. The method of circuit integration is not limited to LSI, but may be a dedicated circuit or a general-purpose processor. An FPGA (Field Programmable Gate Array) that can be programmed after manufacture of the LSI or a reconfigurable processor that can reconfigure the connection and setting of circuit cells inside the LSI may be used. If integrated circuit technology that replaces LSI emerges as a result of advances in semiconductor technology or other derived technology, it is naturally also possible to integrate functional blocks using this technology. There is a possibility of adaptation of biotechnology.

The present invention can be realized not only as the power supply device management system 1, the power supply device 20, and the server 10 as described above, but can also be realized as a method including characteristic processes performed by the power supply device management system 1, the power supply device 20, or the server 10 as steps.

The present invention can be realized as a program for causing a computer (processor) to execute the characteristic processes included in the above method, or can be realized as any medium such as a computer (processor) readable non-transitory recording medium on which the program is recorded, for example, a flexible disk, a hard disk, a CD-ROM, a MO, a DVD, a DVD-ROM, a DVD-RAM, a BD (Blu-ray (registered trademark) Disc), a semiconductor memory, a flash memory, a magnetic storage device, an optical disk, and a paper tape. Such a program can be distributed via a recording medium such as a CD-ROM and a transmission medium such as the Internet.

A form constructed by freely combining the components included in the above-described embodiment and its modifications is also included in the scope of the present invention.

INDUSTRIAL APPLICABILITY

The present invention can be applied to a power supply device or the like that can appropriately manage the power supply device.

DESCRIPTION OF REFERENCE SIGNS

1: power supply device management system
10: server
11: server side acquisition unit
12: server side transmission unit
20: power supply device
21: power supply side acquisition unit
22: power supply side transmission unit
30: communication network
40: map management device

The invention claimed is:
1. A power supply device which is used as a backup power supply, the power supply device comprising a power supply side acquisition device that acquires information related to a geographical position of the power supply device,
wherein the power supply device is connected to a server via a communication network,
wherein the power supply device further includes a power supply side transmission device that transmits the information related to the geographical position to the server via the communication network,
wherein the power supply side transmission device transmits information indicating whether or not a change amount and a change speed of at least one of an installation position and a posture of the power supply device exceeds respective predetermined threshold values as the information related to the geographical position to the server, and
wherein an energy storage device supplies power to the power supply side acquisition device and to an external device to which the power supply device is connected when power supply from an external power supply to the power supply device and the external device is interrupted.

2. The power supply device according to claim 1, further comprising the energy storage device connected to the external power supply and supplied with power from the external power supply.

3. The power supply device according to claim 1, wherein the power supply side acquisition device acquires information indicating at least one of the installation position and the posture of the power supply device as the information related to the geographical position.

4. The power supply device according to claim 1, wherein the power supply side acquisition device acquires information indicating at least one of the change amount and the change speed of the at least one of the installation position and the posture of the power supply device as the information related to the geographical position.

5. The power supply device according to claim 1, wherein the power supply side acquisition device acquires the information indicating whether or not the change amount and the change speed of the at least one of the installation position and the posture of the power supply device exceeds the respective predetermined threshold values as the information related to the geographical position.

6. The power supply device according to claim 5, wherein the power supply side acquisition device acquires the information indicating whether or not the change amount and the change speed exceeds the respective predetermined threshold values by determining whether or not the at least one of the change amount and the change speed exceeds the respective predetermined threshold values.

7. The power supply device according to claim 5, wherein the power supply side acquisition device issues an alarm when the information indicating that the change amount and the change speed exceeds the respective predetermined threshold values is acquired.

8. The power supply device according to claim 1, wherein the power supply side transmission device transmits information indicating at least one of the installation position and the posture of the power supply device as the information related to the geographical position to the server.

9. The power supply device according to claim 1, wherein the power supply side transmission device transmits information indicating at least one of the change amount and the change speed of at least one of the installation position and the posture of the power supply device as the information related to the geographical position to the server.

10. The power supply device according to claim 1, wherein the power supply side transmission device issues an alarm to the server when at least one of the change amount and the change speed exceeds the respective predetermined threshold values.

11. The power supply device according to claim 1, wherein the power supply side acquisition device acquires the information related to the geographical position using GPS (Global Positioning System).

12. The power supply device according to claim 1, wherein the power supply device comprises an uninterruptible power supply system.

13. A server which is connected to a power supply device via a communication network, the server comprising:
  a server side transmission device that transmits a signal that requests acquisition of information related to a geographical position of the power supply device to the power supply device via the communication network; and
  a server side acquisition device that acquires the information related to the geographical position from the power supply device via the communication network,
  wherein the power supply device includes a power supply side transmission device that transmits the information related to the geographical position to the server via the communication network,
  wherein the power supply side transmission device transmits information indicating whether or not a change amount and a change speed of at least one of an installation position and a posture of the power supply device exceeds respective predetermined threshold values as the information related to the geographical position to the server, and
  wherein an energy storage device supplies power to the power supply side acquisition device and to an external device to which the power supply device is connected when power supply from an external power supply to the power supply device and the external device is interrupted.

14. The server according to claim 13, wherein the server side acquisition device further acquires map information associated with identification information on the power supply device, compares the acquired information related to the geographical position with the map information, and specifies the identification information on the power supply device having the information related to the geographical position.

15. The server according to claim 13, wherein the server side acquisition device periodically acquires the information related to the geographical position from the power supply device via the communication network.

16. The server according to claim 13, wherein the server side acquisition device acquires device information including a manufacturing time of the power supply device from the power supply device via the communication network.

17. A power supply device management system comprising:
  a server; and
  a power supply device connected to the server via a communication network,
  wherein the power supply device includes a power supply side acquisition device that acquires information related to a geographical position of the power supply device,
  wherein the server includes a server side acquisition device that acquires the information related to the geographical position from the power supply device via the communication network,
  wherein the power supply device further includes a power supply side transmission device that transmits the information related to the geographical position to the server via the communication network,
  wherein the power supply side transmission device transmits information indicating whether or not a change amount and a change speed of at least one of an installation position and a posture of the power supply device exceeds respective predetermined threshold values as the information related to the geographical position to the server, and
  wherein an energy storage device supplies power to the power supply side acquisition device and to an external device to which the power supply device is connected when power supply from an external power supply to the power supply device and the external device is interrupted.

18. A power supply device which is usable as a backup power supply, the power supply device comprising a power supply side acquisition device that acquires information related to a geographical position of the power supply device,
  wherein the power supply side acquisition device acquires information indicating a posture of the power supply device as the information related to the geographical position,
  wherein a power supply side transmission device transmits information indicating whether or not a change amount and a change speed of at least one of an installation position and a posture of the power supply device exceeds respective predetermined threshold values as the information related to the geographical position to a server and wherein an energy storage device supplies power to the power supply side acquisition device and to an external device to which the power supply device is connected when power supply from an external power supply to the power supply device and the external device is interrupted.

* * * * *